United States Patent
Alex et al.

(10) Patent No.: US 8,189,281 B2
(45) Date of Patent: May 29, 2012

(54) MAGNETIC RECORDING DISK DRIVE WITH WRITE DRIVER TO WRITE HEAD TRANSMISSION LINE HAVING NON-UNIFORM SECTIONS FOR OPTIMAL WRITE CURRENT PULSE OVERSHOOT

(75) Inventors: Michael Alex, Fremont, CA (US); John Thomas Contreras, Palo Alto, CA (US); Nobumasa Nishiyama, Yokohama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 292 days.

(21) Appl. No.: 12/641,362

(22) Filed: Dec. 18, 2009

(65) Prior Publication Data

US 2011/0149441 A1 Jun. 23, 2011

(51) Int. Cl.
G11B 5/09 (2006.01)
G11B 5/48 (2006.01)
(52) U.S. Cl. ...................................... 360/46; 360/245.9
(58) Field of Classification Search ........................ None
See application file for complete search history.

(56) References Cited

U.S. PATENT DOCUMENTS

| | | | |
|---|---|---|---|
| 5,712,749 | A | 1/1998 | Gustafson |
| 5,737,152 | A | 4/1998 | Balakrishnan |
| 5,995,328 | A | 11/1999 | Balakrishnan |
| 6,275,358 | B1 | 8/2001 | Balakrishnan et al. |
| 6,731,467 | B1 | 5/2004 | Balakrishnan |
| 6,762,913 | B1 | 7/2004 | Even et al. |
| 6,791,429 | B2 | 9/2004 | Mikalauskas |
| 7,352,535 | B2 | 4/2008 | Arya et al. |
| 7,417,818 | B2 | 8/2008 | Yuuki et al. |
| 7,460,338 | B2 | 12/2008 | Okabe |
| 2006/0158785 | A1 | 7/2006 | Arya et al. |

FOREIGN PATENT DOCUMENTS

JP 2001-202601 7/2001

OTHER PUBLICATIONS

Jury, J. C. et al., "Designing Disk Drive Interconnects to Obtain a Desired Transmitted Write Current Waveform", IEEE Transactions on Magnetics, vol. 38, No. 1, Jan. 2002, pp. 55-60.
Taratorin, A. M. et al.,"Media Saturation and Overwrite in Perpendicular Recording", IEEE Transactions on Magnetics, vol. 42, No. 2, Feb. 2006, pp. 157-162.

*Primary Examiner* — Daniell L Negron
*Assistant Examiner* — Regina N Holder
(74) *Attorney, Agent, or Firm* — Thomas R. Berthold

(57) ABSTRACT

An interconnect between the write driver and the write head in a magnetic recording disk drive enables an inherent write current overshoot. The interconnect includes an integrated lead suspension (ILS) and a short flex cable that connects the write driver circuitry to the ILS. The interconnect is a two-segment transmission line, with the first segment connected to the write driver having multiple sub-segments or sections with non-uniform impedance levels. The section of the first segment that connects to the write driver is the short flex cable and has an impedance substantially higher than the source impedance $Z_{WD}$ of the write driver. The multiple sections of the first segment have non-uniform impedance values that have an effective impedance $Z_{01\text{-}eff}$ that substantially matches $Z_{WD}$. The second segment of the transmission line has an effective impedance $Z_{02\text{-}eff}$ that is substantially less than $Z_{01\text{-}eff}$. The write lines for the +W and −W signals are preferably interleaved on the transmission line sections.

12 Claims, 9 Drawing Sheets

MAGNETIC RECORDING DISK DRIVE WITH WRITE DRIVER TO WRITE HEAD TRANSMISSION LINE HAVING NON-UNIFORM SECTIONS FOR OPTIMAL WRITE CURRENT PULSE OVERSHOOT

BACKGROUND OF THE INVENTION

1. Field of the Invention

The invention relates generally to the interconnect between the read/write circuitry and the read/write head in a magnetic recording hard disk drive (HDD), and more particularly to an interconnect with a transmission line optimized for overshoot of the write current pulses.

2. Description of the Related Art

In magnetic recording HDDs, the read/write head is formed on an air-bearing slider that rides on a thin film of air above the rotating disk. A mechanical suspension comprised of a flexure with a gimbal at its end connects the slider to the disk drive's actuator arm. The slider is attached to the gimbal which allows for slight movement on the air bearing as the disk rotates. A transmission line provides electrical connection from the read/write circuitry, typically in a read preamplifier/write driver module or chip, through a short flex cable and suspension to the read and write elements on the slider. A suspension that integrates the mechanical connection with the electrical connection is called an integrated lead suspension (ILS) that is connected between the flex cable and connection pads on the slider. A typical ILS is a generally flexible laminate of a conductive metal substrate like stainless steel, an insulating dielectric layer like polyimide, and electrically conductive copper lines or traces patterned on the dielectric layer. The transmission line for the signals from the write driver to the write head thus include electrically conductive traces on the flex cable and the ILS.

The write driver circuitry typically provides a single-point input to the transmission line for each of the positive and negative write signals (+W and -W). The write driver circuitry provides current through the transmission line to the write element or head. The write driver circuitry power supply voltage and performance of the current through the write head depends on the characteristic impedance of the transmission line because the launch voltage at the write driver's output directly depends on the write-current signal times the characteristic impedance.

In current HDDs, boosts or overshoot of the write current pulses to the write head are used to overcome the relatively slow magnetic response of the head and media, i.e., the magnetic recording layer on the disk. Thus, the overshoot is required to create the precise magnetic write field profile with sharp field gradient, i.e., the correct magnetic "footprint", in the disk media. The lack of a precise magnetic footprint can cause problems at low and high data rates. Therefore, the overshoot of the write current pulses is typically required at all times. The present solution to achieving fast magnetic flux reversals is to use electronics in the write driver circuitry to create write current overshoot. However, the use of electronics can be a limiting factor as data rates are increased and power supply voltages are reduced, which limits the write driver's current drive capability. Another approach for achieving faster magnetic flux reversals uses transmission line reflections. This inherent transmission line overshoot approach reduces the overshoot requirement from the write driver circuitry.

What is needed is a HDD with a write driver to write head transmission line with a characteristic impedance that provides optimal overshoot for the write current pulses.

SUMMARY OF THE INVENTION

The invention relates to an interconnect between the write driver and the write head in a magnetic recording disk drive that enables an inherent write current overshoot. The interconnect includes an ILS and a short flex cable that connects the write driver circuitry to the ILS. The interconnect is a two-segment transmission line, with the first segment connected to the write driver having multiple sub-segments or sections with non-uniform impedance levels. The section of the first segment that connects to the write driver is the short flex cable and has an impedance substantially higher than the source impedance $Z_{WD}$ of the write driver. The multiple sections of the first segment have non-uniform impedance values that counterbalance the parasitic capacitances at the write driver output, the high impedance section of the short flex cable of the interconnect, and the parasitic capacitances near and at the write head. The non-uniform impedance values of the sections making up the first segment have an effective impedance $Z_{01\text{-}eff}$ that substantially matches $Z_{WD}$. The second segment of the transmission line, the segment between the first segment and the write head, may be a single segment or optionally may be made up of multiple sections with non-uniform impedance values that have an effective impedance $Z_{02\text{-}eff}$ that is substantially less than $Z_{01\text{-}eff}$. The individual values of impedances for the sections of the first transmission line segment may be obtained by proper design of the widths of the write lines or traces for each individual section. Additionally, or instead of proper design of trace width, the individual impedance values may be obtained by proper design of the trace thickness. The write lines for the +W and -W signals are preferably interleaved on the transmission line sections, which allows for the implementation of a much wider impedance range for the different transmission line sections than could be achieved without interleaving.

For a fuller understanding of the nature and advantages of the present invention, reference should be made to the following detailed description taken together with the accompanying figures.

DETAILED DESCRIPTION OF THE INVENTION

Figure 1:
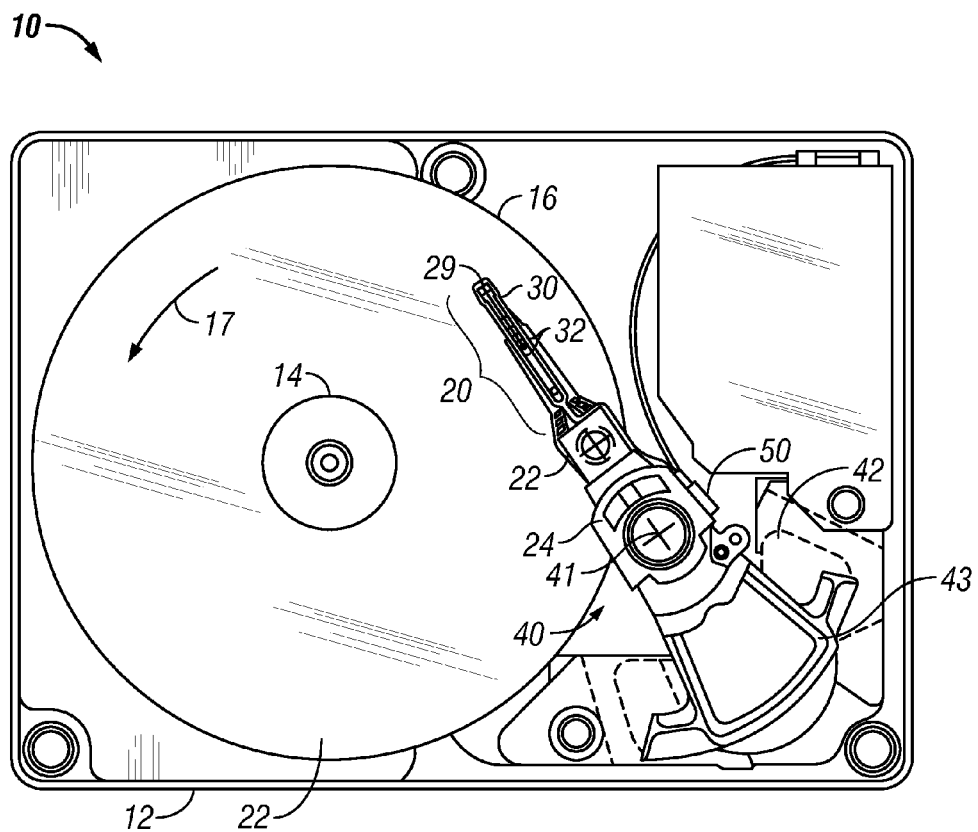
FIG. 1 is a top plan view of a head/disk assembly (HDA) of a hard disk drive and illustrates an integrated lead suspension (ILS) having an electrical trace interconnect array according to the prior art.

FIG. 1 is a top plan view of a head/disk assembly (HDA) of a hard disk drive 10. The hard disk drive 10 has at least one load beam assembly 20 having an integrated lead suspension (ILS) with an array 32 of electrically conductive interconnect traces or lines that connect to a read/write head 29. The load beam assemblies 20 are attached to rigid arms 22 connected to an E-block 24. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. Disk drive 10 also includes a rotary actuator assembly 40 rotationally mounted to the base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the heads 29 to the data tracks on the disks. The trace interconnect array 32 connects at one end to the read/write head 29 and at its other end through a short flex cable to read/write circuitry contained in an electrical module or chip 50 secured to a side of the E-block 24. The chip 50 includes a read preamplifier/write driver circuit.

Figure 2A:
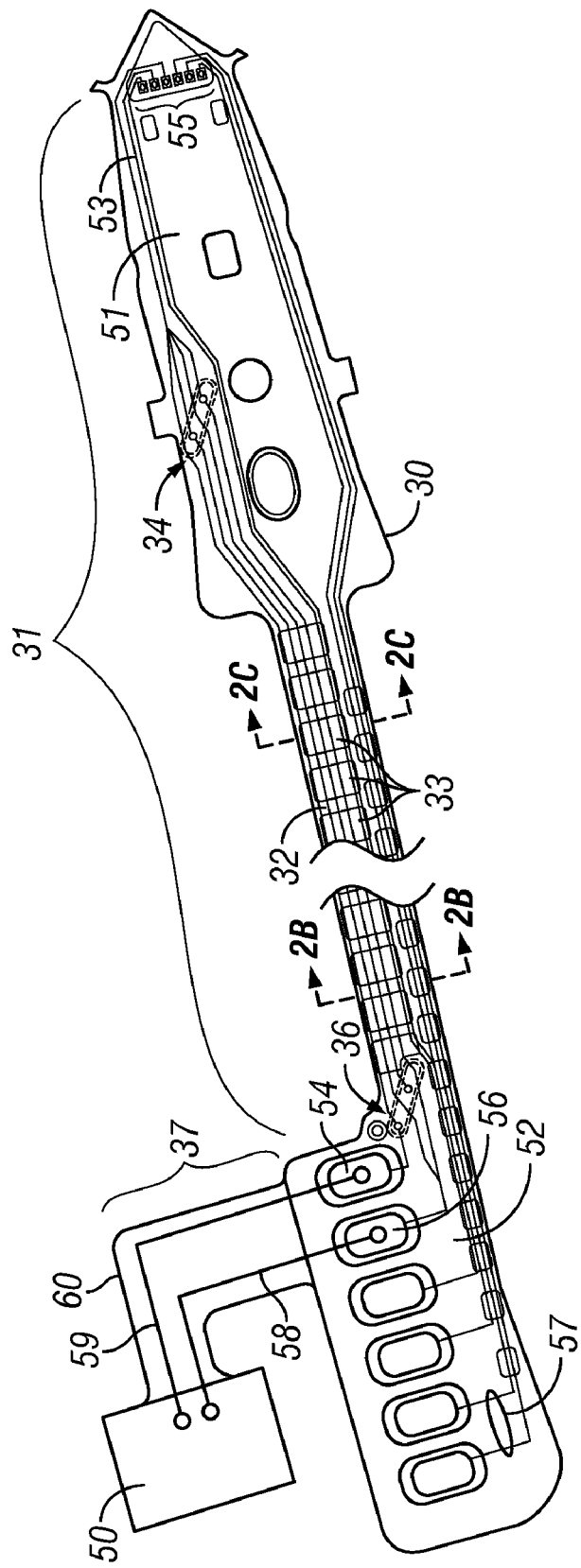
FIG. 2A is a plan view of the ILS and read/write chip showing a four-interleave transmission line between the read/write chip and the gimbal portion of the ILS according to the prior art.

FIG. 2A is a plan view of the ILS 30 and chip 50 showing the transmission line that connects the chip 50 with the read/write head. The ILS 30 includes a transmission line 31 between a gimbal portion 51 and a flex cable pad portion 52. The ILS 30 is a laminate comprised of three layers: a conductive substrate, an insulating dielectric layer, a conductive layer for the electrical traces or lines, and an optional insulating dielectric cover layer. The gimbal portion 51 supports a slider (not shown) that contains the read/write heads 29 (FIG. 1) and has conductive traces 53 leading to pads 55 for electrical connection to pads on the slider. The ILS 30 has an electrical connection end 34 that is connected to traces 53 on gimbal portion 51. The flex cable pad portion 52 has a plurality of electrical connection pads, like pads 54, 56 that are electrically connected to chip 50 via a flex cable 60. The flex cable 60 connects the chip 50 mounted on the side of the E-block 24 (FIG. 1) to the pads, like pads 54, 56 on the ILS 30. Only the −W and +W electrical leads 58, 59, respectively, are depicted to simplify the illustration in FIG. 2A. The ILS 30 has an electrical connection end 36 that is connected to pads 54, 56 on flex cable pad portion 52. A plurality of interleaved electrically conductive traces or lines 32, extend generally parallel to one another along the body of the ILS 30 between the flex cable pad portion 52 and the gimbal portion 51. The lines 32 form part of the transmission line 31 of the ILS 30 from the write driver in chip 50 with the write head on the slider attached to gimbal end 51. The other part of the transmission line from the write driver in chip 50 to the write head is the transmission line 37 on flex cable 60, specifically lines 58, 59.

Figure 2B:
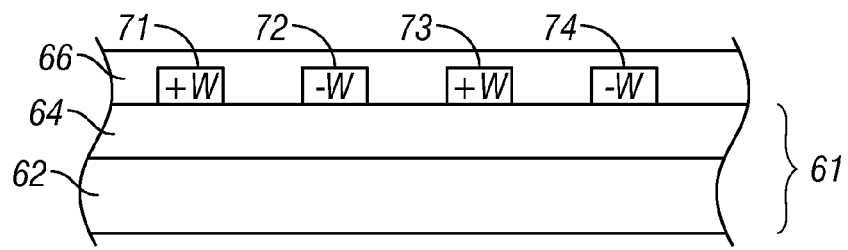
FIG. 2B is an expanded sectional view through section 2B-2B of the ILS in FIG. 2A to illustrate its laminated construction.
Figure 2C:
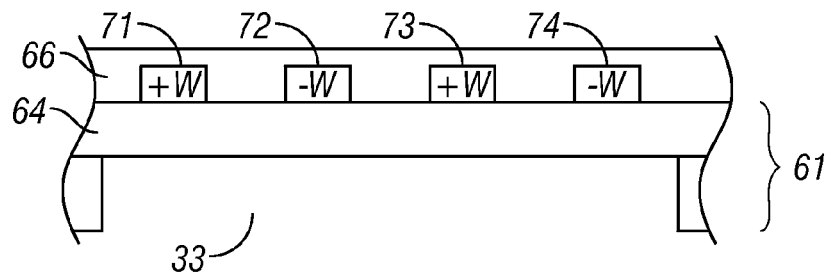
FIG. 2C is an expanded sectional view through section 2C-2C of the ILS in FIG. 2A and illustrates a window or gap in the ILS.

FIGS. 2B and 2C are sectional views of the transmission line segment 31 showing the trace interconnect array of lines 32 (FIG. 2A) grouped as a first set of lines 71, 73 (the +W line), and a second set of lines 72, 74 (the −W lines). The lines 71-74 are typically formed of copper and are illustrated as carrying differential write signals (+W and −W) with the signals being interleaved. The ILS 30 also includes conductive traces or lines 57 (FIG. 2A) that connect the read preamplifier in chip 50 with the read head on the slider attached to gimbal end 51.

FIG. 2B is an expanded sectional view through section 2B-2B of transmission line segment 31 in FIG. 2A and shows its laminated construction. The transmission line segment 31 includes a generally planar support member 61, a plurality of four interleaved electrically conductive write traces or lines, like lines 71, 73 in a first set and lines 72, 74 in a second set, and an optional insulating dielectric cover layer 66. The lines 71-74 carry differential write signals (+W and −W) with the signals being interleaved. The support member 61 includes a conductive base or substrate 62, typically formed of metal like stainless steel, and an insulator layer 64, formed of a dielectric material like polyimide, between the traces 71-74 and substrate 62. The support substrate 62 is typically about 18 microns thick and the insulating dielectric layer 64 is typically about 10 microns thick. The optional dielectric cover layer 66 is also typically formed of polyimide to a thickness of about 15 microns over the tops of the lines 71-74. The write lines are shown as being divided into four interleaved lines, but the write lines could be divided into more than four lines, e.g., eight lines, to reach the desired characteristic impedance level.

The transmission line 31 may also include a plurality of windows or gaps 33 in substrate 62 of the laminate, as shown in FIG. 2A. This is illustrated in FIG. 2C, which is sectional view of section 2C-2C of FIG. 2A. In the gaps there is no stainless steel below the dielectric layer 64. The gaps reduce the signal losses caused by the conductive substrate 62. The interleaving, the conductive substrate 62, and windows or gaps 33 allow for a wider adjustment of the interconnect characteristic impedance $Z_0$ of transmission line 31.

Figure 2D:
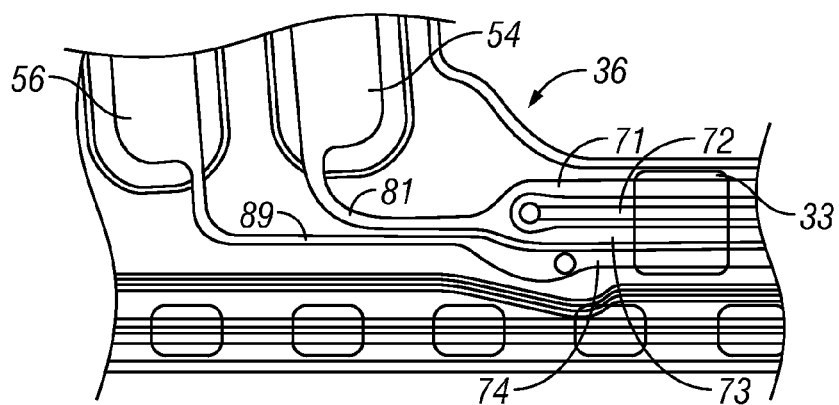
FIG. 2D is a plan view of a portion of the ILS showing an end with the interleaved connection of the +W and -W signal lines to the pads.

FIG. 2D is a plan view of a portion of ILS 30 showing end 36 and the connection to pads 54, 56. In this example the transmission line has the write lines divided into four interleaved lines. Pad 54 is connected to the +W signal and is connected via lead 81 directly to lines 71 and 73. Pad 56 is connected to the −W signal and is connected directly via lead 89 to line 74 and then through a via to line 72. The signal lines 71, 73, in the first set and the lines 72, 74 in the second set are interleaved and are coplanar on insulating layer 64 and run generally parallel to one. In FIG. 3A, each signal is thus fanned out into two lines, with the +W and −W signals being interleaved as shown. The number of lines can be increased, for example from the 4 shown to 6, 8, 10, 12 . . . etc., to reach the desired characteristic impedance level. The single-source connections, 54 and 56, allow for a simple 2-pad connection to the adjoining electrical interconnect, which allows for a simple mechanical connection. If space is allowed, multiple interleaved pads can be used.

Figure 3:
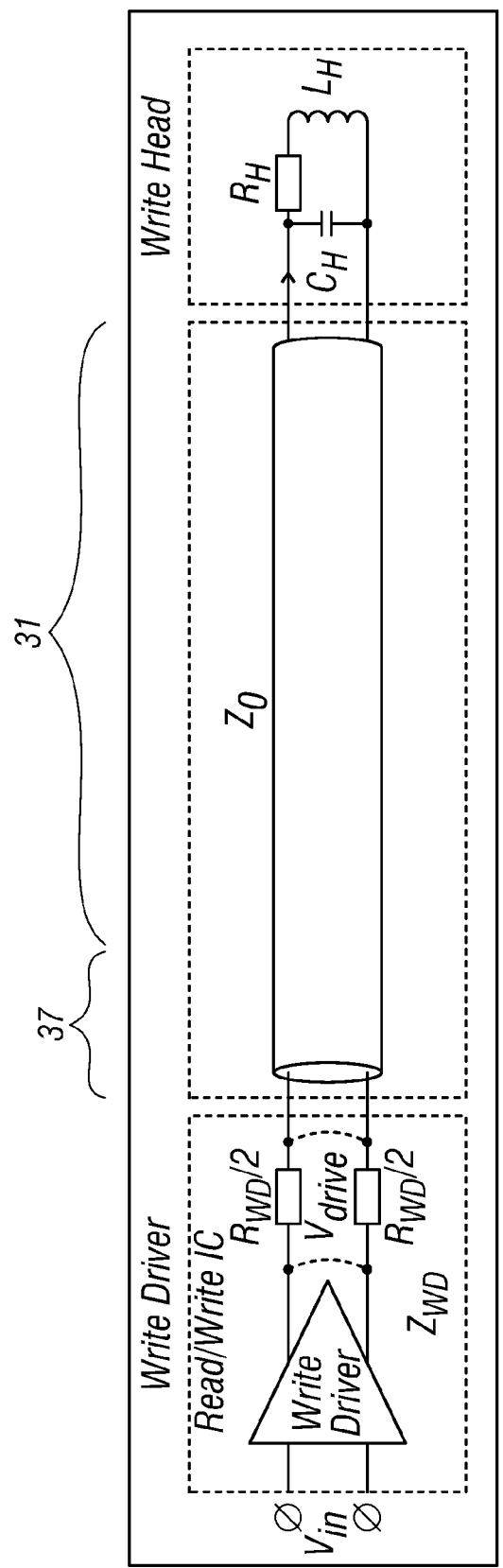
FIG. 3 is a schematic representation of the differential signal mode and illustrates the transmission line with characteristic impedance $Z_0$ between the write driver circuitry and the write head according to the prior art.

FIG. 3 is a schematic illustration of the interconnect between the write driver circuitry and the write head. The write driver operates at a voltage $V_{drive}$ and has a resistance $R_{WD}$, represented by two resistors, each with resistance $R_{WD}/2$. The write driver circuitry is required to supply a wideband signal, typically with relevant frequency content from as low as 0.01 GHz up to 1.5 GHz or higher in future higher data rate hard disk drive systems. The write driver circuitry is connected to the transmission line 37 of flex cable 60 (FIG. 2A) and the write head is connected to the transmission line 31 of the ILS 30 (FIG. 2A). In current HDDs, boosts or overshoot of the write current pulses to the write head are used to create precise magnetic footprints in the disk media. This precision is required at low data rates and at high data rates. Typically, the relatively slow magnetic flux reversal in the head and media is the bottleneck to achieving higher performance in data rates and areal densities. The present solution to achieving fast magnetic flux reversals is to use electronics in the write driver circuitry to create write current overshoot. However, the use of electronics can be a limiting factor as data rates increase and power supply voltages decrease.

Figure 4:
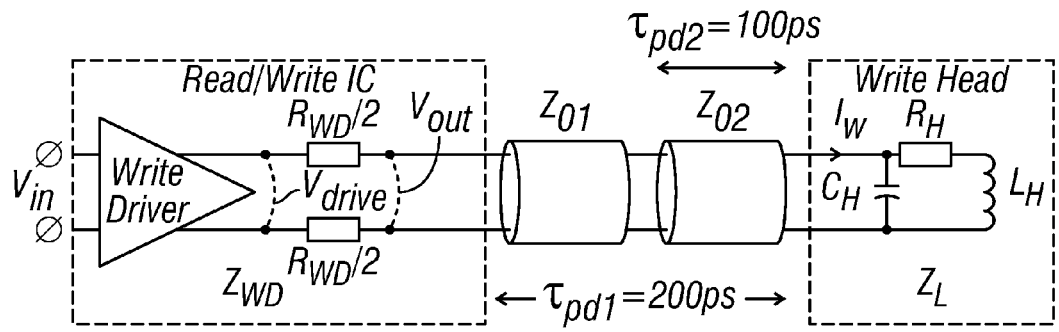
FIG. 4 is a schematic illustration of the interconnect between the write driver circuitry and the write head for a two-segment transmission line with the impedance of the first segment matched to the impedance of the write driver embodiment according to prior art.
Figure 5:
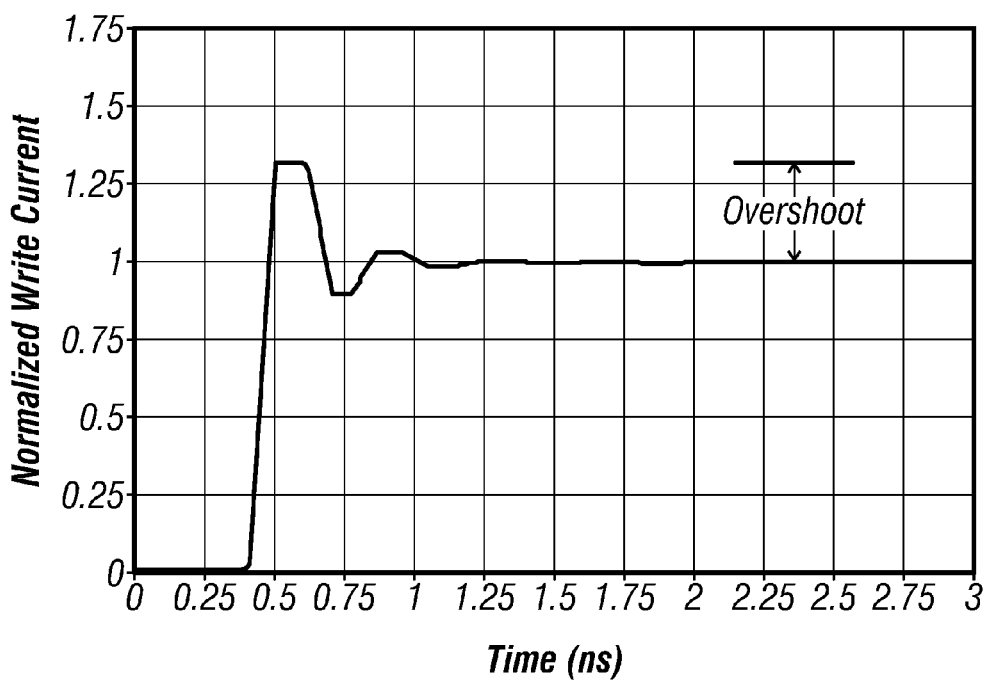
FIG. 5 is a graph of the normalized write current as a function of time for the prior art interconnect of FIG. 4.
Figure 6:
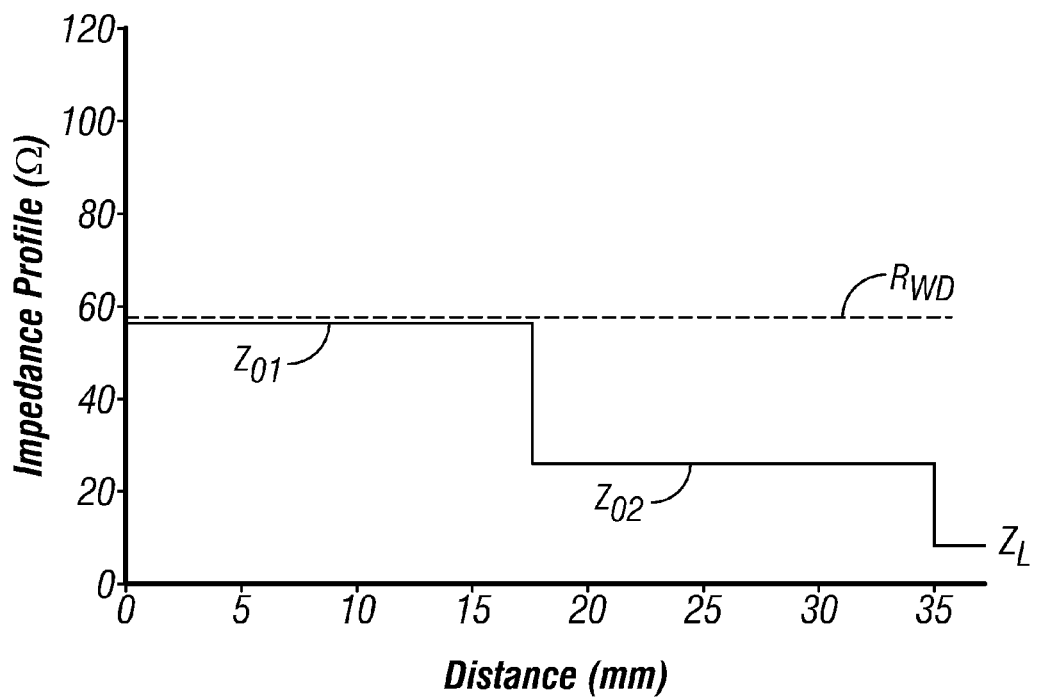
FIG. 6 is a graph of the impedance profile for a two-segment transmission line according to the prior art showing the impedance of the first segment matched to the impedance of the write driver.

Another proposed approach for achieving faster magnetic flux reversals uses transmission line reflections and is described by Jury, J. C. et al. "Designing Disk Drive Interconnects to Obtain a Desired Transmitted Write Current Waveform", IEEE TRANSACTIONS ON MAGNETICS, VOL. 38, NO. 1, JANUARY 2002 pp. 55-60. This inherent transmission line overshoot approach reduces the overshoot requirement from the write driver circuitry. A multiple segment transmission line to achieve overshoot of write current pulses is described in U.S. Pat. Nos. 7,460,338 B2 and 7,417,818 B2, both assigned to Hitachi. To achieve the required overshoot, the first segment, the one that connects to the write driver, is required to have an impedance $Z_{01}$ that matches the impedance $Z_{WD}$ of the write driver, and each successive segment from the first segment to the segment that connects to the write head is required to have a successively smaller impedance. FIG. 4 is an example of a schematic illustration of the interconnect between the write driver circuitry and the write head for a two-segment embodiment according to the '818 patent. The write driver operates at a voltage $V_{drive}$ and has a resistance $R_{WD}$, represented by two resistors, each with resistance $R_{WD}/2$, and supplies write current $I_w$ to the write head. The impedance $Z_{01}$ of the first segment matches the impedance $Z_{WD}$ of the write driver and is greater than the impedance $Z_{02}$ of the second segment, which in turn is greater than the load impedance $Z_L$. FIG. 5 shows the normalized write current as a function of time for the interconnect of FIG. 4. The write current overshoot at the beginning of the write current pulse is about 30% of the nominal write current, i.e., the write current after the overshoot has ended. This overshoot is a result of the transmission line reflection due to impedance mismatching of $Z_{01}$ and $Z_{02}$. The overshoot duration is set by design and determined by propagation delay time of the interconnect with impedance $Z_{02}$ and is $2\tau_{pd2}$ where typical propagation delay time for the full transmission line $\tau_{pd1}$ could be on the order of 200 ps, and $\tau_{pd2}$ is on the order of 100 ps as shown in FIG. 4. This duration is shorter if the length of the second segment with impedance $Z_{02}$ would be made shorter and the length of the first segment with impedance $Z_{01}$ is increased. A shorter overshoot duration is desirable for high data rates, such that sequential signal transitions do not interfere with one another. FIG. 6 is a graph of the impedance profile for a two-segment transmission line according to the '818 patent for a 35 mm long transmission line between the write driver and the write head. To achieve the required overshoot, the first segment has an impedance $Z_{01}$ that matches the impedance $R_{WD}=Z_{WD}$ of the write driver, and the second segment has an impedance $Z_{02}$ less than $Z_{01}$ and greater than $Z_L$. If there were more than two segments, the graph of FIG. 6 would look like a series of downward steps, with each successive segment beginning with the second segment having an impedance less than the impedance of the immediately preceding segment.

However, due to parasitic capacitances at the write driver and write head connections to the transmission line, which are caused by pads and vias at these connections, and cost constraints for the short flex cable 60 (FIG. 2A), the multiple-segment transmission line approach described by the '818 patent does not result in the optimal solution. The present invention provides a multiple-segment transmission line that generates an inherent write current boost by the use of transmission line sub-segments or sections with non-uniform impedance levels, wherein the section that connects to the write driver has an impedance substantially higher than $Z_{WD}$. The transmission line segments with multiple sections having non-uniform impedance values counterbalance the parasitic capacitances at the write driver output, the high impedance section of the short flex cable portion of the interconnect, and the parasitic capacitances near and at the write head.

Figure 7:
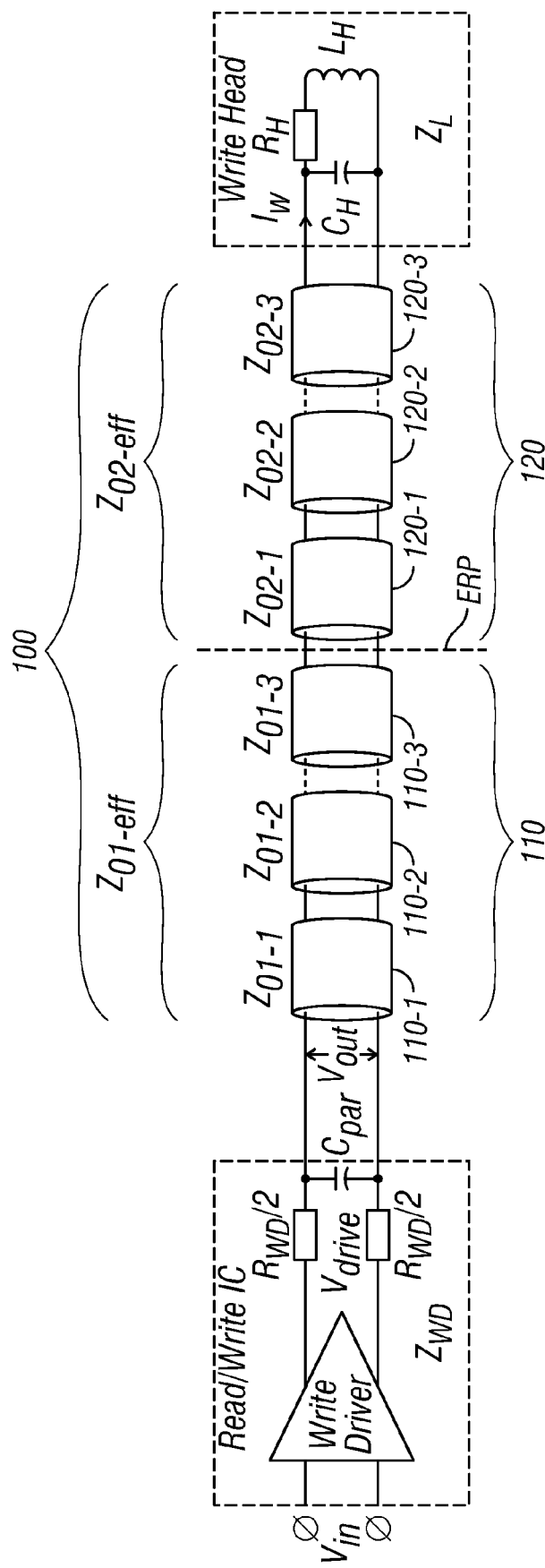
FIG. 7 is a schematic illustration of the interconnect between the write driver circuitry and the write head according to the present invention showing the two-segment transmission line with the first segment having multiple sections.

FIG. 7 is a schematic illustration of the interconnect between the write driver circuitry and the write head according to the present invention. The interconnect is via a transmission line 100, which includes the transmission line of the flex cable, like transmission line 37 of flex cable 60, and the transmission line of the ILS, like transmission line 31 of ILS 30, all of which are depicted in the prior art figure of FIG. 2A. The write driver operates at a voltage $V_{drive}$ and has a resistance $R_{WD}$, represented by two resistors, each with resistance $R_{WD}/2$, and with parasitic capacitance $C_{par}$. The write driver provides an output voltage $V_{out}$ to the transmission line 100 and write current $I_w$ to the write head. The transmission line 100 between the write driver and the write head has two segments 110 and 120 connected at an extended reference plane (ERP). Segment 110 is made up of at least two sections, with three sections 110-1, 110-2 and 110-3 being shown in FIG. 7. The first section 110-1 has an impedance $Z_{01-1}$ that is deliberately not matched with $Z_{WD}$ but is substantially greater than $Z_{WD}$, i.e., $Z_{01-1}$ is more than 50 percent greater than $Z_{WD}$. Additionally, each of the successive sections in segment 110 has a unique impedance value that may be either less than or greater than $Z_{01-1}$. The non-uniform impedance values of the sections making up segment 110 have an effective impedance $Z_{01-eff}$ that substantially matches $Z_{WD}$, i.e., $Z_{01-eff}$ is substantially equal to (within 10) percent of $Z_{WD}$. Segment 120 may be a single segment or optionally may be made up of multiple sections. Segment 120 is shown with three sections 120-1, 120-2 and 120-3 in FIG. 7. Each of the sections in segment 120 has a unique impedance value. The non-uniform impedance values of the sections making up segment 120 have an effective impedance $Z_{02-eff}$ that is substantially less than $Z_{01-eff}$, i.e., $Z_{02-eff}$ is less than about 90 percent of $Z_{01-eff}$.

The $Z_{01-eff}$ impedance segment must be set to be equivalent to $R_{WD}$, i.e., within 10 percent of $R_{WD}$. As mentioned above, the inherent parasitic capacitances from the write driver's chip-carrier and short flex cable reduce the high-frequency impedance value of $Z_{WD}$. To step through each impedance section the transmission line output impedance must be set to be equivalent to $R_{WD}$. A fundamental expression for the output impedance of a transmission line is shown in Eq. 1. For Eq. 1, $Zout_N$ is the output impedance at the last value of interconnect N, the preceding output impedance value of the interconnect is $Zout_{N-1}$, and the $Z_{0N}$ value is the characteristic impedance of the Nth section.

$$Zout_N = Z_{0N} \frac{Z_{outN-1} + iZ_{0N}\tan\beta L}{Z_{0N} + iZ_{outN-1}\tan\beta L} \qquad \text{Eq. 1}$$

where $\beta$=phase constant and L=length of the section with impedance $Z_{0N}$. The expression in Eq. 1 is used to assemble chain equations from N down to including the number of sections that comprise the first segment with $Z_{01\text{-}eff}$. A software program like MATLAB can be used to perform the calculations.

The means of determining the impedance profile can start from the write driver itself. From Eq. 1 it can be seen that if $Zout_{N-1}$ equals $Z_{0N}$, the equation reduces to $Zout_N=Z_{0N}$, which is a match condition. For the condition where the $Zout_{N-1}$ is less than $Z_{0N}$, Eq. 1 reduces down to the following expression in Eq. 2.

$$Zout_N \approx Z_{outN-1} + iZ_{0N}\tan\beta L = Z_{outN-1} + iZ_{0N}\tau_{pd}\omega \qquad \text{Eq. 2}$$

where $\beta$=phase constant, L=length of $Z_{0N}$, $\tau_{pd}$=propagation delay of $Z_{01}$, and $\omega$=frequency in radians.

As mentioned above, the interconnect impedance at the output of the write driver is increased to make the effective output impedance Zout equivalent to the source impedance $Z_{WD}$. This first step in creating the non-uniform impedance level is to offset the parasitics of the write driver, $C_{par}$. The impedance of the flex cable portion, which is the first section of the first segment with $Z_{01\text{-}eff}$, can be offset with $C_{par}$, and Eq. 1 shows that with a low output impedance, $Z_{WD}$, the first section can be considered as an inductor, $(L=Z_{01\text{-}eff\text{-}1}\tau_{pd})$. Next, the known transmission line expression for inductance and capacitance is used, as shown in Eq. 3.

$$Z_0 = \sqrt{L/C} \qquad \text{Eq. 3}$$

For example, for $C_{par}$ equal to 1 pF and for a propagation delay $(\tau_{pd})$ of 40 ps, the $Z_{01\text{-}eff\text{-}1}$ impedance level would then need to be 90Ω with a $R_{WD}$ of 60Ω, using Eq. 3 and Eq. 2. This means of calculating the impedance levels is latticing from the source. An alternative means of determining the impedance levels is latticing from the output. This method is used to set the output at the extended reference plane (ERP) to be equivalent to the real part of the write driver's output impedance, $R_{WD}$. From the reflection equation for a transmission line and using the $Zout_N$ expression, the following expression is determined:

$$\Gamma = \frac{Zout_N - R_{WD}}{Zout_N + R_{WD}} \qquad \text{Eq. 4}$$

Figure 8:
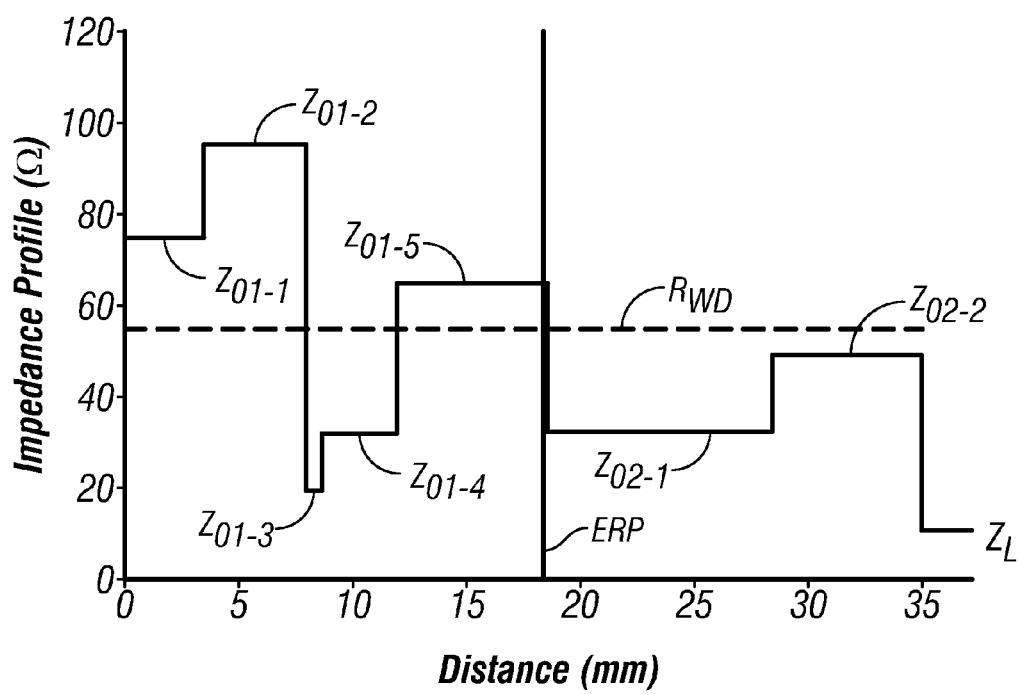
FIG. 8 is a graph of the impedance profile for the multiple-segment transmission line according to the present invention for a 35 mm long transmission line with five non-uniform transmission line sections in the first segment.

By having $\Gamma$ equal to zero, the output impedance at the ERP will then be equivalent to $R_{WD}$. In addition, a combination of latticing from source and output can be used to determine the solution. FIG. 8 is a graph of the impedance profile for the multiple-segment transmission line according to the present invention for a 35 mm long transmission line with five non-uniform transmission line sections in the first segment. The example shown in FIG. 8 shows an increase of impedance for the parasitics at the output of the write driver ($Z_{01\text{-}1}$ and $Z_{01\text{-}2}$), then to compensate for the reflections from $Z_{01\text{-}1}$ and $Z_{01\text{-}2}$, a relative, to $R_{WD}$, low impedance section $Z_{01\text{-}4}$ section is added. The $Z_{01\text{-}5}$ section would be closer to $R_{WD}$, but inherent to the pad layout, 54 and 56, there is a low impedance section, $Z_{01\text{-}3}$, which leads to a slightly higher impedance value for the $Z_{01\text{-}5}$ section. The combination of these non-uniform impedance levels sets the output at the ERP to be equivalent to the output impedance of the write driver, $R_{WD}$ ($\Gamma$=0). In addition, Eq. 1 and the parasitics are dependent on the frequency range, so the frequency range can be set for determining the optimum impedance values for the impedance sections.

FIG. 8 shows the lengths and impedance values for each of the five sections. The impedance $Z_{01\text{-}1}$ for the first section connected to the write driver is about 70Ω, which is substantially greater than the 55Ω impedance value for $Z_{WD}$. This first section is preferably the entire transmission line of the short flex cable connecting the write driver to the pads on the ILS. Each of the remaining four sections $Z_{01\text{-}2}$ to $Z_{01\text{-}5}$ has a unique impedance value, but the effective impedance $Z_{01\text{-}eff}$ is substantially equivalent to $R_{WD}$, but comprised of non-uniform impedance values with some values substantially larger than $R_{WD}$. FIG. 8 also shows that each of the sections has a unique length, although it is within the scope of the invention that they have substantially the same length, i.e., all the lengths are within 10 percent of one another.

FIG. 8 also shows the lengths and impedance values for each of the two sections $Z_{02\text{-}1}$ and $Z_{02\text{-}2}$ making up second segment 120. The effective impedance $Z_{02\text{-}eff}$ is 40Ω, which is less than $Z_{01\text{-}eff}$ and greater than $Z_L$. The effective impedance $Z_{02\text{-}eff}$ can also be calculated from Eq. 1, and this equation is the expression for the input impedance and is reformed into Eq. 5, where the Nth segments lead to the write head's impedance.

$$Zin_N = Z_{0N} \frac{Z_{outN+1} + iZ_{0N}\tan\beta L}{Z_{0N} + iZ_{outN+1}\tan\beta L} \qquad \text{Eq. 5}$$

Figure 9:
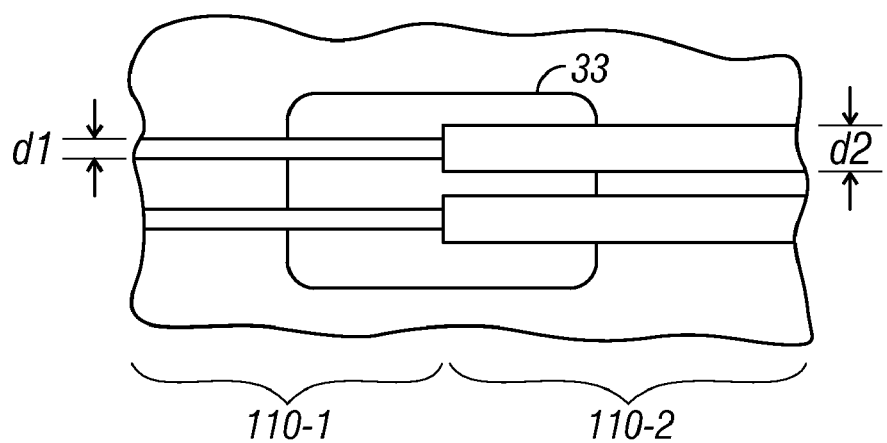
FIG. 9 is an illustration of the interface between two transmission line sections over a windowed metal backplane according to the invention.

In designing the transmission line of this invention, the individual values of impedances, such as $Z_{01\text{-}1}$ to $Z_{01\text{-}N}$ for the sections of the first transmission line segment, may be obtained by proper design of the widths of the traces for each individual section. This is depicted in FIG. 9, which is a typical interface between section 110-1 and 110-2, and shows section 110-1 with trace widths d1 and section 110-2 with trace widths d2. The change in trace widths can be made over a window 33, as shown in FIG. 9, or over a stainless steel region of the ILS. The change in impedance of a fixed-length segment is a function of change in its trace width. Thus if 110-1 and 110-2 had d2 larger than d1, then $Z_{01\text{-}2}$ would be smaller than $Z_{01\text{-}1}$, where $Z_{01\text{-}1}$ and $Z_{01\text{-}2}$ are the characteristic impedances of the transmission line sections that contain 110-1 and 110-2, respectively. Additionally, or instead of proper design of trace width, the individual impedance values may be obtained by proper design of the trace thickness. Also, the use of interleaving of the write traces allows for the implementation of a much wider impedance range for the different transmission line sections than could be achieved without interleaving.

Figure 10:
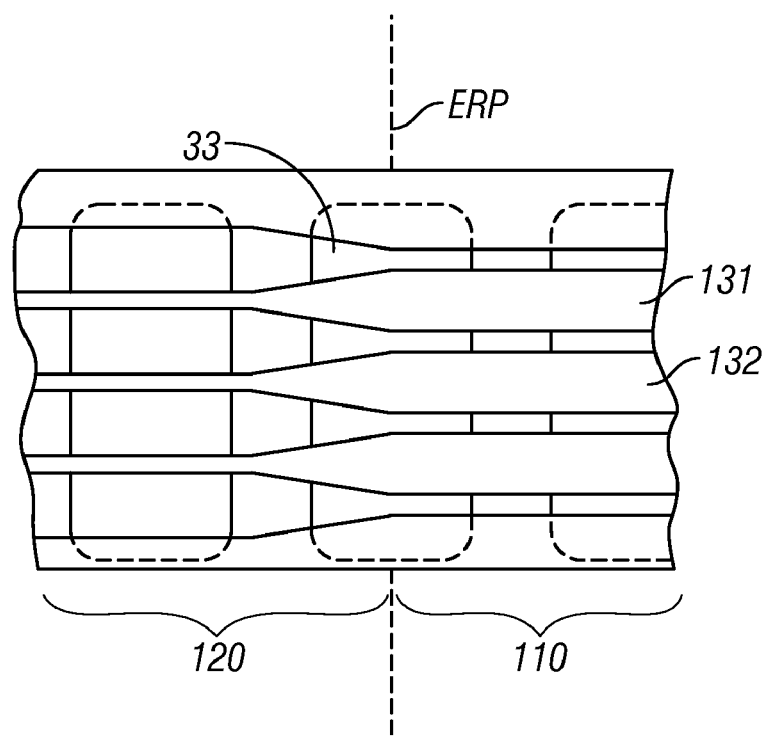
FIG. 10 is a schematic showing the connection at the extended reference plane (ERP) between the two transmission line segments according to the invention.

FIG. 10 is a schematic showing the connection at the extended reference plane (ERP) between the two transmission line segments 110 and 120. The write traces 131, 132 are shown as being slightly tapered from a larger width in segment 110 to a narrower width in segment 120 over a window 33.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. In a magnetic recording disk drive having write driver circuitry having a source impedance and an inductive write head having a load impedance, an interconnect between the write driver circuitry and the write head comprising:
a two-segment transmission line connecting the write driver circuitry to the write head, the first segment connecting the write driver circuitry to the second segment and having an effective characteristic impedance that substantially matches the source impedance, and a second segment connecting the first segment to the write head; wherein the first segment comprises at least two transmission line sections, the first section connected to the write driver and having a characteristic impedance substantially greater than the source impedance; and wherein the transmission line comprises a first set of electrically conductive traces for positive (+W) write signals and a second set of electrically conductive traces for negative (−W) write signals, and the +W and −W signal traces are interleaved.

2. The interconnect of claim 1 wherein said at least two sections of the first transmission line segment have substantially the same length.

3. The interconnect of claim 1 wherein said at least two sections of the first transmission line segment have substantially different lengths.

4. The interconnect of claim 1 wherein the transmission line comprises a plurality of electrically conductive traces, and wherein the width of the traces of the first section of the first segment is different from the width of the traces of a second section connected to said first section.

5. The interconnect of claim 4 wherein the width of the traces of each section of the first segment is different from the width of the traces of sections connected to each said section.

6. The interconnect of claim 1 wherein the second transmission line segment has an effective characteristic impedance less than the effective characteristic impedance of the first transmission line segment and greater than the load impedance.

7. The interconnect of claim 6 wherein the second transmission line segment comprises at least two transmission line sections.

8. The interconnect of claim 1 wherein the output impedance at the first segment is substantially equal to the real part $R_{WD}$ of the output impedance $Z_{WD}$ of the write driver circuitry.

9. A system for interconnection of a magnetic recording disk drive write driver to a magnetic recording disk drive write head comprising:
a write driver having a source impedance;
an inductive write head having a load impedance;
a transmission line connecting the write driver to the write head and formed as a first set of electrically conductive traces for positive (+W) write signals from the write driver and a second set of electrically conductive traces for negative (−W) write signals from the write driver, the +W and −W signal traces being interleaved, the transmission line further comprising a flex cable portion and an integrated lead suspension (ILS) portion, the flex cable portion being connected between the write driver and a first end of the ILS, and the second end of the ILS being connected to the write head; and
wherein the transmission line has a first segment comprising at least two transmission line sections, the first section being said flex cable portion and having a characteristic impedance substantially greater than the source impedance, and a second segment, and
wherein the first segment has an effective characteristic impedance that substantially matches the source impedance.

10. The system of claim 9 wherein the width of the traces of each section of the first segment is different from the width of the traces of sections connected to each said section.

11. The system of claim 9 wherein the second transmission line segment has an effective characteristic impedance less than the effective characteristic impedance of the first transmission line segment and greater than the load impedance.

12. The system of claim 9 wherein the output impedance at the first segment is substantially equal to the real part $R_{WD}$ of the source impedance $Z_{WD}$.

* * * * *